US008957938B2

(12) United States Patent
Lei (10) Patent No.: US 8,957,938 B2
(45) Date of Patent: Feb. 17, 2015

(54) METHOD AND APPARATUS FOR HANDING OVER A VIDEO CONVERSATION FROM PACKET SWITCH DOMAIN TO CIRCUIT SWITCH DOMAIN (75) Inventor: Zhengxiong Lei, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 224 days.

(21) Appl. No.: 13/503,891

(22) PCT Filed: Oct. 28, 2009

(86) PCT No.: PCT/CN2009/074660
§ 371 (c)(1),
(2), (4) Date: Apr. 25, 2012

(87) PCT Pub. No.: WO2011/050525
PCT Pub. Date: May 5, 2011

(65) Prior Publication Data
US 2012/0212569 A1  Aug. 23, 2012

(51) Int. Cl.
H04N 7/14 (2006.01)
H04W 36/00 (2009.01)
H04L 29/06 (2006.01)

(52) U.S. Cl.
CPC ........... H04W 36/0022 (2013.01); H04N 7/148 (2013.01); H04L 65/1083 (2013.01)
USPC ........ 348/14.02; 370/252; 370/328; 370/335; 370/390; 370/466; 434/236; 455/404.1; 455/422.1; 455/437; 455/445; 455/556.1; 709/232; 709/250; 713/168; 726/12

(58) Field of Classification Search
CPC ... H04N 7/148; H04M 7/006; H04L 12/4633; H04W 72/005
USPC ............... 348/14.02; 370/331, 332, 352, 355, 370/466, 252, 328, 335, 338, 356, 390, 370/401; 455/432.1, 435.2, 436, 437, 455/556.1, 404.1, 411, 422.1, 432.2, 445, 455/449; 434/236; 709/232, 250; 713/168; 726/12
See application file for complete search history.

(56) References Cited

U.S. PATENT DOCUMENTS 7,046,647 B2 * 5/2006 Oba et al. ...................... 370/331
7,898,564 B2 3/2011 Kim et al.
(Continued)

FOREIGN PATENT DOCUMENTS

CN 101370266 A 2/2009
CN 101400090 A 4/2009
(Continued)

OTHER PUBLICATIONS

3rd Generation Partnership Project; Technical Specification Group Services and System Aspects; Single Radio Voice Call Continuity (SRVCC); Stage 2 (Release 9), 3GPP TS 23.216, Sep. 2009, V9.1.0, URL: http://www.3gpp.org/ftp/Specs/archive/23_series/23.216/23216-910.zip.
(Continued)

Primary Examiner — Gerald Gauthier
(74) Attorney, Agent, or Firm — Fay Sharpe LLP (57) ABSTRACT The invention proposes a method and corresponding apparatuses for handing over a video conversation from a PS domain to a CS domain in a radio network. When signals of a network covered by the packet switch domain where the video conversation currently locates in are not good or become unavailable, as long as source MME and eNodeB detect the presence of video conversation, a procedure of handover to circuit switch domain for video bearer will be initiated, and a handover request will be transmitted to MSC server. After receiving the handover request, a control equipment in the circuit switch domain will request for resources to a target radio network requesting for the allocation of necessary communication link to the video bearer. In addition, after local UE has handed over to the target network (at this time, the communication link required for the video bearer between UE and MSC Server/MGW has already been established), local UE and MSC Server/MGW start a negotiation to establish a logical communication channel for the video conversation. Upon a successful negotiation, a logical communication channel for transferring video telephone service between MSC Server/MGW and UE is established. In this way, local UE can continue the video conversation with remote UE via MGW.

16 Claims, 5 Drawing Sheets (56) References Cited

U.S. PATENT DOCUMENTS

| | | | |
|---|---|---|---|
| 7,978,683 B2* | 7/2011 | Balogh et al. | 370/352 |
| 8,169,968 B1* | 5/2012 | Stegall et al. | 370/331 |
| 8,249,019 B2* | 8/2012 | Mahdi | 370/331 |
| 8,289,920 B2* | 10/2012 | Wang et al. | 370/331 |
| 8,446,899 B2* | 5/2013 | Lei et al. | 370/352 |
| 8,576,795 B2* | 11/2013 | Ulupinar et al. | 370/331 |
| 8,606,276 B2* | 12/2013 | Bornier et al. | 455/437 |
| 8,638,749 B2* | 1/2014 | Cherian et al. | 370/331 |
| 8,644,258 B2* | 2/2014 | Lei | 370/331 |
| 2002/0194385 A1* | 12/2002 | Linder et al. | 709/250 |
| 2003/0104814 A1* | 6/2003 | Gwon et al. | 455/436 |
| 2004/0240430 A1* | 12/2004 | Lin et al. | 370/352 |
| 2004/0246990 A1* | 12/2004 | Krishnamurthi et al. | 370/466 |
| 2005/0143072 A1* | 6/2005 | Yoon et al. | 455/436 |
| 2005/0227691 A1* | 10/2005 | Pecen et al. | 455/435.2 |
| 2006/0018280 A1* | 1/2006 | Kumar et al. | 370/331 |
| 2006/0045049 A1* | 3/2006 | Chung et al. | 370/331 |
| 2006/0099949 A1* | 5/2006 | Jung et al. | 455/436 |
| 2006/0140150 A1* | 6/2006 | Olvera-Hernandez et al. | 370/331 |
| 2006/0154665 A1 | 7/2006 | Svensson et al. | |
| 2007/0036109 A1* | 2/2007 | Kwak et al. | 370/331 |
| 2007/0127415 A1* | 6/2007 | Spear | 370/331 |
| 2007/0171867 A1* | 7/2007 | Kim | 370/331 |
| 2007/0189268 A1 | 8/2007 | Mitra et al. | |
| 2008/0025263 A1 | 1/2008 | Pelkonen | |
| 2008/0081310 A1 | 4/2008 | Smith et al. | |
| 2008/0259869 A1* | 10/2008 | Wang et al. | 370/331 |
| 2008/0280612 A1 | 11/2008 | Bornier et al. | |
| 2008/0291905 A1* | 11/2008 | Chakravadhanula et al. | 370/355 |
| 2008/0305826 A1* | 12/2008 | Morita et al. | 455/556.1 |
| 2009/0005044 A1 | 1/2009 | Payyappilly et al. | |
| 2009/0016300 A1* | 1/2009 | Ahmavaara et al. | 370/331 |
| 2009/0176489 A1* | 7/2009 | Ulupinar et al. | 455/432.2 |
| 2009/0180440 A1* | 7/2009 | Sengupta et al. | 370/331 |
| 2009/0201878 A1* | 8/2009 | Kotecha et al. | 370/331 |
| 2009/0271623 A1* | 10/2009 | Forsberg et al. | 713/168 |
| 2009/0286527 A1* | 11/2009 | Cheon et al. | 455/422.1 |
| 2009/0303966 A1* | 12/2009 | Cherian et al. | 370/331 |
| 2010/0061340 A1* | 3/2010 | Ramle et al. | 370/331 |
| 2010/0120432 A1* | 5/2010 | Watfa et al. | 455/436 |
| 2010/0142488 A1 | 6/2010 | Zhang et al. | |
| 2010/0190500 A1* | 7/2010 | Choi et al. | 455/436 |
| 2010/0330987 A1* | 12/2010 | Lee | 455/432.1 |
| 2011/0044198 A1* | 2/2011 | Persson et al. | 370/252 |
| 2011/0181682 A1 | 7/2011 | Belling et al. | |
| 2012/0212569 A1* | 8/2012 | Lei | 348/14.02 |
| 2012/0236831 A1* | 9/2012 | Sayeedi et al. | 370/332 |
| 2012/0281673 A1* | 11/2012 | Nix | 370/331 |

FOREIGN PATENT DOCUMENTS

| | | |
|---|---|---|
| CN | 101400090 A | 4/2009 |
| CN | 101472220 A | 7/2009 |
| CN | 101472220 A | 7/2009 |
| JP | 2006-074555 A | 3/2006 |
| JP | 2008-518501 A | 5/2008 |
| JP | 2008-527926 A | 7/2008 |
| JP | 2009-513045 A | 3/2009 |
| JP | 2009-516405 A | 4/2009 |
| JP | 2009-526484 A | 7/2009 |
| JP | 2009-540721 A | 11/2009 |
| JP | 2010-532140 A | 9/2010 |
| WO | WO2008081310 A1 | 7/2008 |

OTHER PUBLICATIONS

3rd Generation Partnership Project; Technical Specification Group Services and System Aspects; Feasibility Study of Single Radio Video Call Continuity (vSRVCC); Stage 2 (Release 10), 3GPP TR 23.886, Sep. 2010, V1.0.0, URL: http://www.3gpp.org/ftp/Specs/archive/23_series/23.886/23886-100.zip.

International Search Report for PCT/CN2009/074660 dated Aug. 12, 2010.

* cited by examiner

METHOD AND APPARATUS FOR HANDING OVER A VIDEO CONVERSATION FROM PACKET SWITCH DOMAIN TO CIRCUIT SWITCH DOMAIN

FIELD OF THE INVENTION

The invention relates to a communication network, and particularly to a method and apparatus for handing over a video conversation from a Packet Switch domain to a Circuit Switch domain in a mobile network.

BACKGROUND

We are currently experiencing rapid merging of fixed and mobile networks, and IMS (IP Multimedia Subsystem) appears in such environment. IMS is a global, access-independent and standards-based IP communication link and service control architecture, which makes it possible for users of common Internet protocol based terminal to use different types of multimedia services. IMS system not only provides a variety of access manners, but also provides interworking with a circuit switch domain. For a multi-mode mobile terminal locating within a packet switch domain, it can hand over a conversation from the packet switch domain to a circuit switch domain to ensure conversation quality, when it moves to an edge of or outside the network covered by the packet switch domain, or when the network covered currently by the packet switch domain becomes unavailable while it locates within the network covered by the circuit switch domain.

3GPP TS 23.216 specifies for calls anchored in IMS system a SRVCC (Single Radio Voice Call Continuity) solution between EPS (Evolved Packet System) PS (Packet Switch) access and UTRAN/GERAN (Universal Terrestrial Radio Access Network/GSM EDGE Radio Access Network) CS (Circuit Switch) access, to maintain continuities of the voice alls. In such situation, UE (User Equipment) is capable of transmitting or receiving data over only one of those two access networks at a given time.

Figure 1:
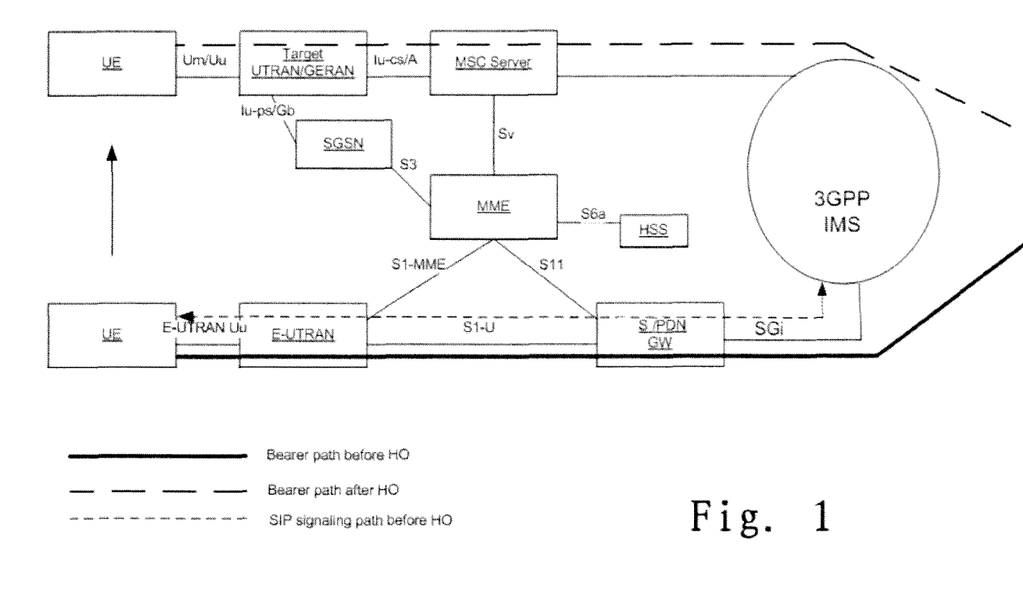
FIG. 1 is a network architecture for SRVCC specified in 3GPP TS 23.216.

FIG. 1 illustrates a network architecture of the SRVCC for VoIP conversation handover from E-UTRAN (Evolved UTRAN) to UTRAN/GERAN as specified in 3GPP TS 23.216.

As shown in FIG. 1, UE accesses IMS via E-UTRAN and S-GW/PDN GW. E-UTRAN is also known as LTE (Long Term Evolution), comprising several E-Nodes B responsible for radio access network part. EPS is simplified as two network elements of eNodeB and EPC by functional integration of NodeB, RNC, and CN of existing WCDMA and TD-SCDMA systems. EPC comprises MME (Mobility Management Entity) for acting as a control node with the responsibility of handling signaling of a core network, and S-GW (Serving GateWay)/PDN-GW (Packet Data Network GateWay) responsible for processing data of the core network. Wherein, a non-3GPP radio access to network may access EPC via PDN-GW, and a 3GPP radio access network may access to EPC via S-GW.

In addition, FIG. 1 further shows interfaces between network elements proposed by the specification. For example, E-UTRAN and EPC are connected via S1 (similar to Iu) interface, E-UTRANs therebetween may connect via X2 (similar to Iur) interface (not shown), and the UE and E-UTRAN are connected via LTE-Uu interface.

In the environment shown in FIG. 1, UE can decide to hand over to a circuit switch domain provided by UTRAN/GERAN when it locates at the edge of coverage of E-UTRAN or outside the covered area. In UTRAN/GERAN, UE accesses to an IMS network via a base station and an MSC (Mobile Switch Center) server.

Wherein, UTRAN is a relatively new access network for UMTS, which has became a more important access manner for UMTS, and may include NodeB, (Node B), RNC (Radio Network Controller), CN (Core Network), etc., wherein one RNC and one or more NodeBs constitute one RNS (Radio Network Subsystem); while GERAN which is a key part of GMS specified and maintained by 3GPP is also included in UMTS/GSM network, and includes a base station BS and a base station controller BSC their interfaces (for example, Ater interface, Abis interface, A interface, etc.). A network of a mobile operator generally consists of a plurality of GERANs which will be combined with UTRAN in a UMTS/GSM network.

Reference may be made with respect to TS 23.216 for detailed information on other network elements in FIG. 1 as well as communication manners between network elements or the like.

Figure 2:
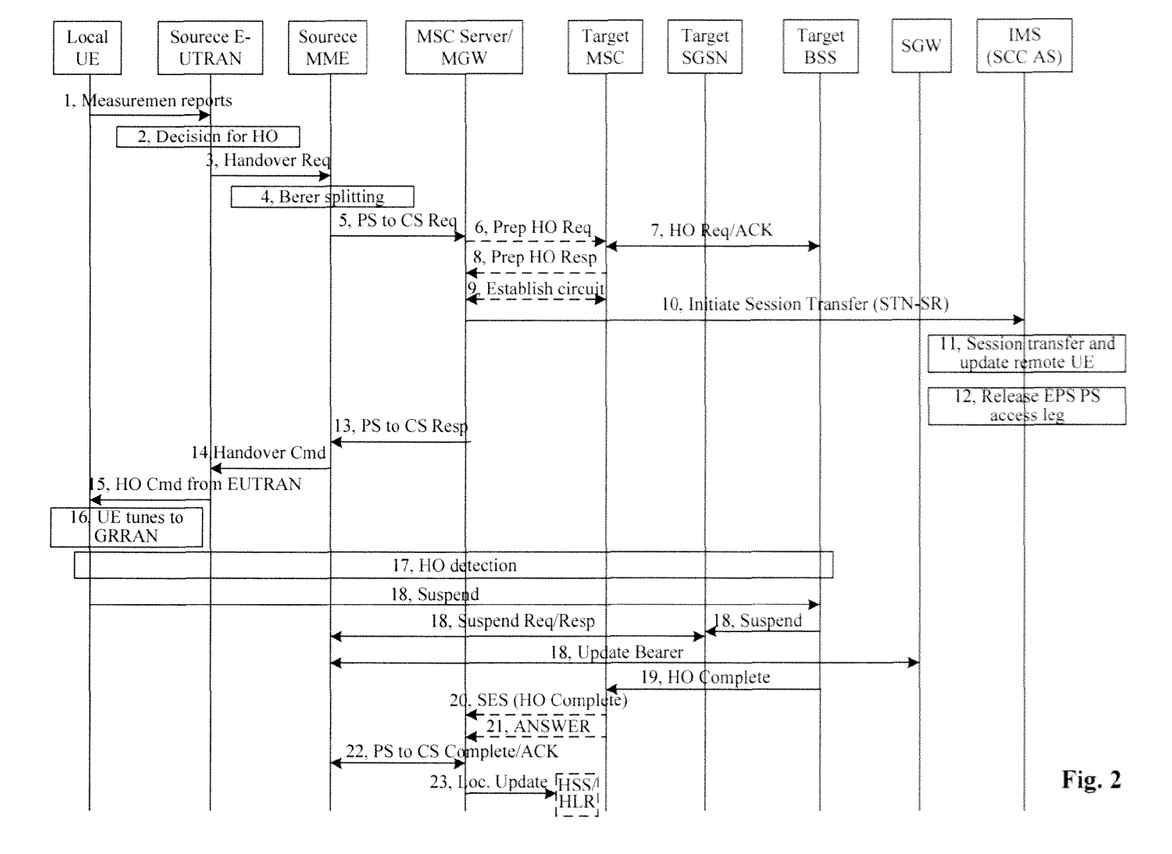
FIG. 2 is a schematic diagram of a conversation flow of SRVCC handed over from E-UTRAN to target UTRAN in prior art.

FIG. 2 illustrates a flow chart of a call of SRVCC handover from E-UTRAN to UTRAN/GERAN as specified in 3GPP TS 23.216. In order to complete the handover of a voice conversation, the voice call needs to be anchored in IMS, such as on SCC AS (Service Centralization and Continuity Application Server), in advance. Steps in FIG. 2 are explained as follows.

Step 1: Local UE founds that signals of the current radio network are not good after a detection, and transmits a measurement report to E-UTRAN.

Step 2: Based on UE's measurement report, source E-UTRAN (specifically, the eNodeB therein) decides to trigger a SRVCC procedure of handing over to UTRAN.

Step 3: Source E-UTRAN transmits Handover Require message to a source MME. SRVCC HO parameter in this message indicates that the target domain of the handover is CS domain.

Step 4: Based on QCI (QoS Class Identity) of an audio bearer and the SRVCC HO parameter, the source MME separates the audio bearer from non-audio bearers, and initiates the PS to CS handover procedure for the audio bearer only to MSC Server.

Step 5: The source MME transmits SRVCC PS to CS Request message to the MSC Server.

Step 6: When the MSC server is different from the target MSC, this MSC server transmits Prepare Handover Request message to the target MSC.

Step 7: The target MSC transmits Relocation Request message to the target RNS, requesting an allocation of relocated related resources of CS domain. The target RNS gives a corresponding response message.

Step 8: When the MSC server is different from the target MSC, the target MSC transmits Prepare Handover Response message to this MSC server.

Step 9: A circuit connection between the target MSC and MGW is established.

Step 10: The MSC Server triggers the session handover procedure, and transmits INVITE message to IMS.

Step 11: SDP using target CS access leg updates a remote UE (i.e., the counter part of establishing the VoIP session with the local UE). At this time, the downlink of the VoIP conversation is handed over to CS domain.

Step 12: EPC PS access leg is released according to 3GPP TS 23.237.

Step 13: The MSC server transmits SRVCC PS to CS Response message to the source MME.

Step 14: The source MME transmits Handover Command message to the source E-UTRAN.

Step 15: The source E-UTRAN transmits Handover from E-UTRAN Command message to UE.

Step 16: UE hands over to the target UTRAN cell.

Step 17: The target RNS detects the attachment of the UE. UE transmits Handover Complete message to the target MSC via the target RNS (specifically, the RNC therein). When the target MSC is not same with the MSC Server, the target MSC transmits SES (Handover Complete) message to the MSC server.

Step 18: The target RNS transmits Relocation Complete message to the target MSC.

Step 19: When the target MSC and the MSC Server are not the same one, the target MSC transmits SES (Handover Complete) message to the MSC Server.

Step 20: In accordance with 3GPP TS 23.009, the target MSC transmits ANSWER message to the MSC server, indicating that a circuit link between the MSC Server and the target MSC has been established.

Step 21: The MSC Server transmits SRVCC PS to CS Complete Notification message to the source MME, and accordingly, the source MME responds to this message.

Step 22: If necessary, the MSC server may transmit MAP Update Location message to HSS/HLR. The MSC Server performs this step to get circuit domain value-added service information.

However, the SRVCC solution specified in 3GPP TS 23.216 is only for audio service, without giving a solution for the handover of video service from PS domain to CS domain for maintaining the continuity thereof.

3GPP TS 23.237 specifies a solution of handovers from PS domain to CS domain for both audio and video services, this solution however only supports Dual Radio UE, i.e., a UE capable of receiving or transmitting data via two types of access networks concurrently, but not Single Radio UE, i.e., a UE can only transmit or receive data only via one of two types of access networks at a moment.

In the increasingly competitive telecommunications industry, service is becoming more diverse and humane, and the requirement for being able to provide video conversation continuity supporting Single Radio is gradually increased, which obviously can not be met by various existing solutions.

SUMMARY

In order to address above defects in prior art, a method and apparatus for handing over a video conversation are proposed.

According to a first aspect of the invention, a method for handing over a video conversation from a packet switch domain to a circuit switch domain is provided, comprising: a) a base station in the packet switch domain transmitting a handover request to a control equipment in the packet switch domain according to a measurement report and an identification of a video bearer, when it receives a measurement report from a user terminal; b) the control equipment in the packet switch domain separating the video bearer from non-video bearer according to the identification of the video bearer, and transmitting a handover request in which the handover being a handover for video bearer is indicated to a control equipment in the circuit switch domain, when it receives the handover request from the base station in the packet switch domain; c) the control equipment in the circuit switch domain transmitting a relocation request in which reserving a communication link with specified rate is indicated to a target radio network controller, when it receives the handover request from the control equipment in the packet switch domain; and d) the user terminal negotiating with the control equipment in the circuit switch domain to establish a logical communication channel required for the video conversation on the communication link with the specified rate, when the user terminal hands over to a target network.

ably, the step d) further comprises the user terminal initiating its negotiation with the control equipment in the circuit switch domain for establishing a logical communication channel required for the video conversation on the communication link with the specified rate, when the user terminal transmits a handover complete message to the target radio network controller.

Preferably, the step d) further comprises the control equipment in the circuit switch domain initiating its negotiation with the user terminal for establishing a logical communication channel required for the video conversation on the communication link with the specified rate, when the control equipment in the circuit switch domain receives the handover complete message from the target radio network controller.

According to a second aspect of the invention, an equipment for handing over a video conversation from a packet switch domain to a circuit switch domain in a base station is provided, comprising: a first receiving means for receiving a measurement report from a user terminal; determining means for determining to hand over the video conversation to the circuit switch domain according to the measurement report and an identification of a video bearer; and a first transmitting means for transmitting a handover request to a control equipment in the packet switch domain.

According to a third aspect of the invention, an apparatus for handing over a video conversation from a packet switch domain to a circuit switch domain in a control equipment in the packet switch domain is provided, comprising: a second receiving means for receiving a handover request from a base station in the packet switch domain; separating means for separating the video bearer from non-video bearer according to the identification of the video bearer; and a second transmitting means for transmitting a handover request in which the handover being a handover for video bearer is indicated to a control equipment in the circuit switch domain.

According to a fourth aspect of the invention, an apparatus for handing over a video conversation from a packet switch domain to a circuit switch domain in a control equipment in the circuit switch domain is provided, comprising: a third receiving means for receiving a handover request from a control equipment in the packet switch domain; a third transmitting means for transmitting a relocation request in which reserving a communication link with a specified rate is indicated to a target radio network controller; and negotiating means for negotiating with a user terminal to establish a logical communication channel required for the video conversation on the communication link with the specified rate.

With the method and apparatus of the invention, the handover of the video conversation from PS domain to CS domain in a mobile network can be completed and its continuity is maintained, thereby users can be provided with service diversification.

BRIEF DESCRIPTION OF THE DRAWINGS

Other features, objectives and advantages of the invention will become more obvious by reading the following detailed description of non limiting embodiments in conjunction with the drawings.

EMBODIMENTS

Upon above analysis, it can be seen that SRVCC solution proposed by 3GPP TS 23.216 specification applies only to an audio conversation, not to a video conversation. The invention proposes a method of handing over a video conversation from a PS domain to a CS domain on the basis of the solution of 3GPP TS 23.216 by utilizing the same network architecture and making corresponding changes according to the characteristics of video conversations.

It should be noted that, in order to support the video conversations, both UE and MSC Server should have the ability of 3G-324M. 3G-324M is a protocol cluster in the mobile network which supports video conversation service on circuit switch domain of the mobile network.

The basic idea of the invention is that, when signals of a network covered by the packet switch domain where the video conversation currently locates are not good or become unavailable, as long as source MME and eNodeB detect the presence of a video conversation, the procedure of handing over to the circuit switch domain for video bearer will be initiated, and a handover request will be sent to MSC server. A control equipment in the circuit switch domain will ask for resources toward a target radio network, requesting an allocation of necessary communication link for the video bearer after receiving above handover request. In addition, local UE and the MSC Server/MGW will start the negotiation to establish a logical communication channel for the video conversation after the local UE handed over to the target network (at this time, the communication link required for the video bearer between UE and the MSC Server/MGW has already been established). After a successful negotiation, the logical communication channel for transmission of video telephone service between the MSC Server/MGW and UE is established. In this way, the local UE can continue the video conversation with remote UE via MGW.

Figure 3:
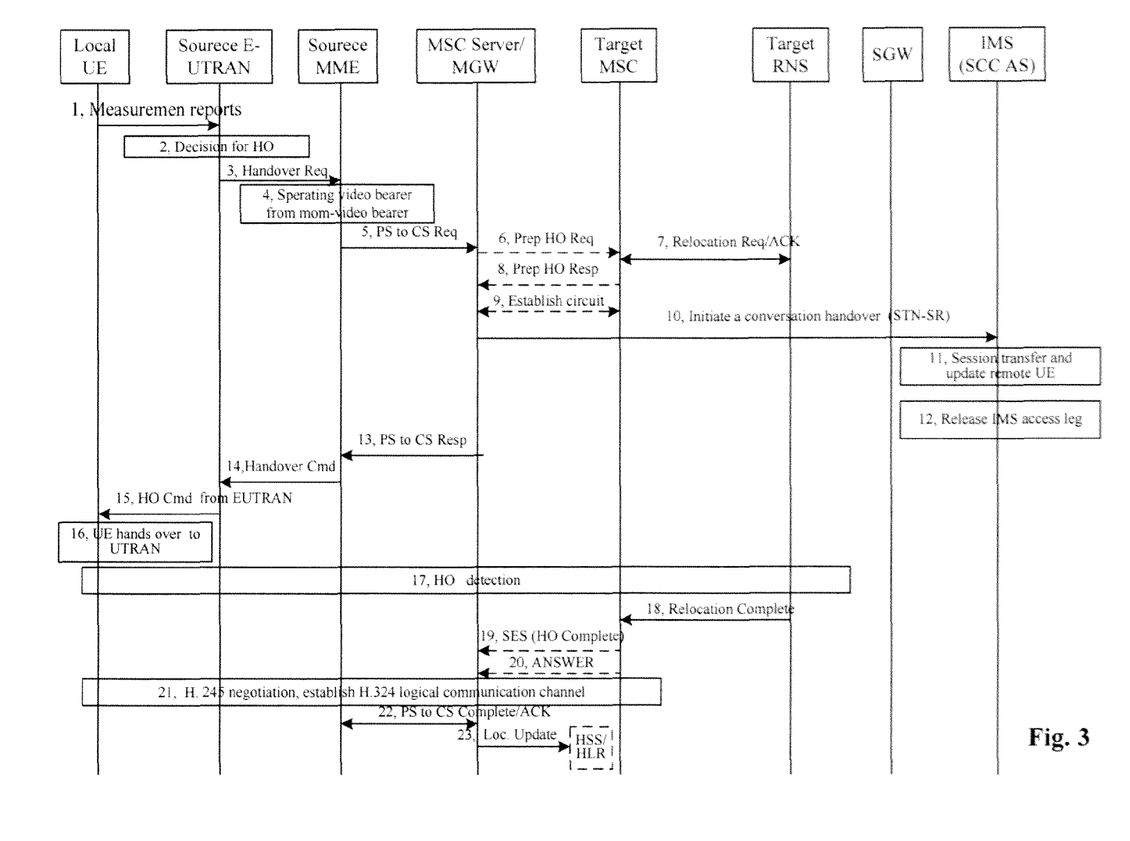
FIG. 3 is a schematic diagram of a call flow handing over a video conversation from E-UTRAN to target UTRAN according to an embodiment of the invention.

FIG. 3 illustrates a call flow chart for handing over a video conversation from a PS domain to a CS domain according to the invention. The process will be described in detail below by comparing with FIG. 2.

Step 1: The same with step 1 in FIG. 2.

Step 2: A bit different from step 2 in FIG. 2. Source E-UTRAN (specifically, eNodeB therein) decides to trigger a handover procedure to UTRAN according to the UE's measurement report and the identification of the video bearer (QCI=2 or 7). That is to say, it is based on the identification of the video bearer that the source E-UTRAN triggers the handover procedure, and as long as there is an identification of a video bearer, the handover procedure will be triggered, no matter whether there is an audio bearer.

Step 3: The same with step 3 in FIG. 2.

Step 4: A bit different from step 4 in FIG. 2. Based on QCI of the video bearer and the SRVCC HO parameter, the source MME separates the video bearer from non-video bearers, and initiates a PS to CS handover procedure for the video bearer to MSC Server.

Step 5: This step is slightly different from step 5 in FIG. 2. Besides the parameters in FIG. 2, the SRVCC PS to CS Request message sent by the source MME to the MSC Server must also indicate that this handover is for a video bearer, for example, indicating to the MSC Server that this handover is a video handover in a way of for example, setting Proprietary value of Private extension parameter in the SRVCC PS to CS Request message as a particular value (such as decimal 100).

Step 6: This step is slightly different from step 6 in FIG. 2. The Prepare Handover Request message sent by MSC Server to the target MSC must indicate that this handover is for a video bearer, for example, indicating to the target MSC that this handover is a video handover in a way of for example, setting speech/data indicator parameter of Radio Resource Information parameter in the Prepare Handover Request message as a particular value (such as binary 1110).

Step 7: A bit different from step 7 in FIG. 2. The Relocation Request message sent by the target MSC to the target RNC must indicate that a 64 kbps (bps, bits per second) communication link necessary for the video conversation must be allocated to it. This step is mainly for the target RNC to allocate corresponding resources, on the one hand, to establish a communication link from the target RNC to the target MSC, on the other hand, to prepare resources on the side of the target RNC for the communication link between the target RNC to UE, but the communication link between the target RNC and UE has not been established yet until the complete execution of step 17. Specifically, "Guaranteed Bit Rate" parameter contained in "RAB Parameters" parameter in "RABs To Be Setup Item IEs" in the list of "RABs To Be Setup List" parameter in Relocation Request message is set to 64 k.

Step 8 to step 15: The same with step 8 to step 15 in FIG. 2.

Step 16: The same with step 16 in FIG. 2. It should be noted that at step 7, before the local UE hands over to the UTRAN target cell, the target RNC has allocated a 64 kbps communication link for the video conversation.

Step 17 to step 20: The same with step 17 to step 20 in FIG. 2.

Step 21: Compared with FIG. 2, this is a step newly added by the invention. The flow proceeds here, a 64 kbps physical communication link for video conversation between UE and the MSC Server has already been established. In this step, an end-to-end negotiation between UE and the MSC Server is conducted, in which how to establish a logical communication channel on the 64 kbps communication link for video conversations is discussed, including codec format used by UE and MGW and the like. The negotiated protocol may be H.245 protocol in the 3G-324M protocol cluster. Specific negotiation procedures can be found in the H.245 specification, including capability negotiation procedure, master-slave determination procedure, open logical communication channel procedure, open multiplexing procedure, which will not be described in detail herein.

There may be two opportunities for the execution of step 21. One is for the MSC Server to initiate its negotiation with UE after step 20 or step 18, wherein when the MSC Server is the same one with the target MSC, step 18 is that the MSC server receives from the target RNC the Relocation Complete message indicating the completion of the handover of the UE handing over to the target radio network. When the MSC Server is not the same with the target MSC, step 20 can also be considered as the MSC Server receives from the target RNC a handover complete message indicating the handover of UE to the target radio network via the target MSC. The other is for UE to initiate its negotiation with the MSC Server after step 17, wherein step 17 is that UE transmits to the target RNS a Handover Complete message indicating the completion of the handover of UE handing over to the target radio network.

Step 22 to step 23: The same with step 21 to step 22 in FIG. 2.

It can be seen that the method for handing over a video conversation from a PS domain to a CS domain proposed by the invention is different from the existing SRVCC solution given by 3GPP TS 23.216 in:

A) When eNodeB receives a measurement report from UE, it determines the video bearer according to the measurement report and the identification of the video bearer, for example, according to QCI, and transmits a handover request, such as the Handover Require message, to the source MME. Namely, steps 2 and 3 shown in FIG. 3.

B) When the source MME receives the handover request from the eNodeB, it separates the video bearer from the non-video bearers according to the identification of the video bearer, and transmits a handover request in which the handover being a handover for video bearer is indicated, such as PS to CS Request message, to MSC server. Namely, steps 4 and 5 shown in FIG. 3.

C) When the MSC server receives the handover request from the source MME, it transmits a relocation request in which reserving a 64 kbps communication link for the video conversation is indicated, such as Relocation Request message, to the target RNC. In the situation that the MSC Server different from the target MSC, the MSC Server transmits the relocation request to the target RNC via the target MSC, as shown in steps 6 and 7 in FIG. 3. If the MSC Server is the same one with the target MSC, the MSC server transmits the relocation request to the target RNC directly, as shown in step 7 in FIG. 3.

D) After UE hands over to the target UTRAN, UE negotiates with the MSC Server to discuss how to establish a logical communication channel for video conversations on the established 64 kbps communication link. The protocol of the negotiation may be H.245 protocol. Namely, step 21 as shown in FIG. 3. Such negotiation can be initiated by UE, or it can also be initiated by the MSC Server. If initiated by UE, it is initiated after UE transmitting a handover complete message (handover mentioned herein refers to the handover in which UE hands over to the target radio network) to the target RNC, namely, step 21 is executed after step 17 as shown in FIG. 3. If initiated by the MSC server, it is initiated after the MSC Server receiving the handover complete message (handover mentioned herein refers to the handover in which UE hands over to the target radio network) from the target RNC: if the MSC server and the target MSC are the same one, the negotiation is initiated after the MSC server receiving the handover complete message (handover mentioned herein refers to the handover in which UE hands over to the target radio network) from the target RNC directly, namely, step 21 is executed after step 18 as shown in FIG. 3; if the MSC server and the to MSC are not the same one, the negotiation is initiated after the MSC server receiving the handover complete message (handover mentioned herein refers to the handover in which UE hands over to the target radio network) from the target RNC via the target MSC, namely, step 21 is executed after step 20 as shown in FIG. 3.

Figure 4:
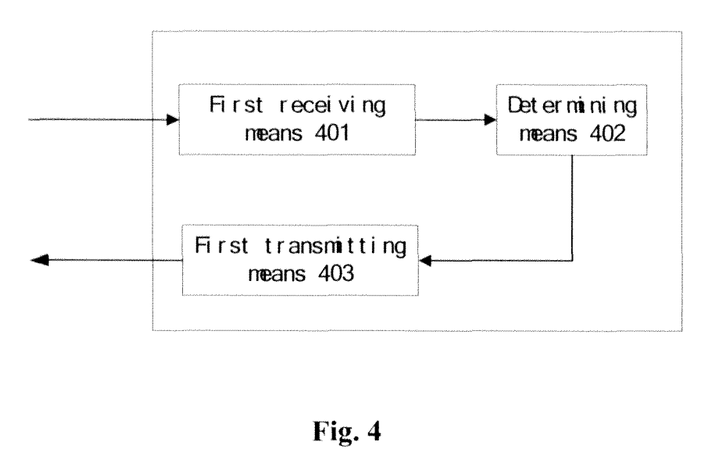
FIG. 4 is an apparatus for handing over a video conversation from E-UTRAN to target UTRAN in a base station according to an embodiment of the invention.

FIG. 4 illustrates an apparatus for handing over a video conversation from E-UTRAN to target UTRAN in a base station according to an embodiment of the invention. Wherein, the first receiving means 401 receives a measurement report from UE, then determining means 402 determines to hand over the current video conversation to CS domain according to the measurement report and QCI of the video bearer, and the first transmitting means 403 is triggered subsequently to transmit a handover request to the source MME, such as the Handover Required message as shown in step 3 in FIG. 3.

Figure 5:
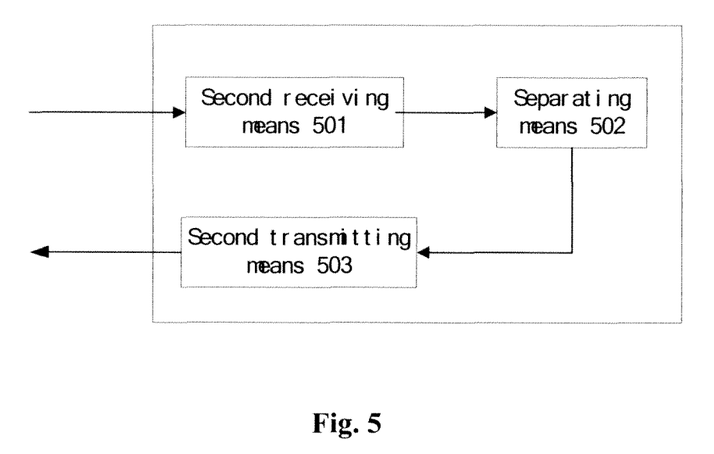
FIG. 5 is an apparatus for handing over a video conversation from E-UTRAN to target UTRAN in MME according to an embodiment of the invention.

FIG. 5 shows an apparatus for handing over a video conversation from E-UTRAN to target UTRAN in MME according to an embodiment of the invention. Wherein, the second receiving means 501 receives the handover request from eNodeB, then separating means 502 separates the video bearer from non-video bearer(s) according to QCI of the video bearer, and the second transmitting means 503 transmits to the MSC Server a handover request subsequently, such as the PS to CS Request message as shown in step 5 in FIG. 3, in which the handover being a handover for video bearer is indicated.

Figure 6:
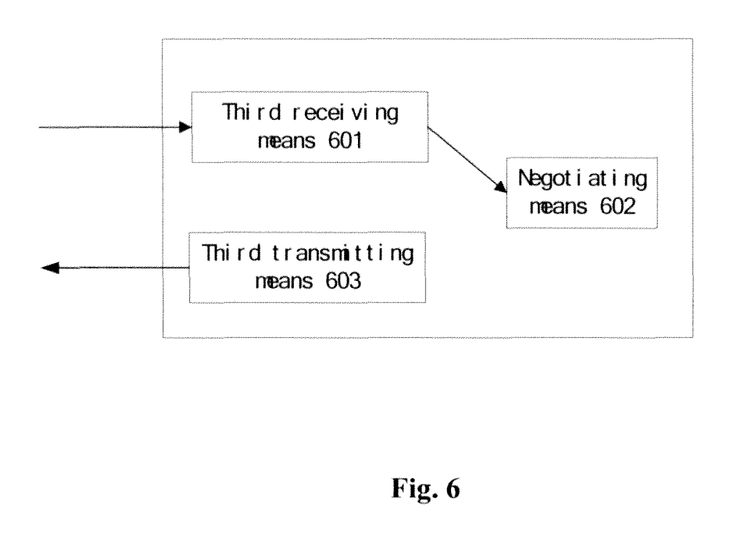
FIG. 6 is an apparatus for handing over a video conversation from E-UTRAN to target UTRAN in MSC server according to an embodiment of the invention.

FIG. 6 illustrates an apparatus for handing over a video conversation from E-UTRAN to target UTRAN in MSC server according to an embodiment of the invention. Wherein, the third receiving means 601 receives a handover request from the source MME, then the third transmitting means 603 transmits to the target RNC a relocation request requesting an allocation of resources, such as the Relocation Request message as shown in step 7 in FIG. 3, wherein, a 64 bps communication link being necessarily reserved for the video conversation is indicated, and negotiating means 602 for negotiating with UE then discusses how to establish a logical communication channel required for the video conversation on the 64 bps communication link.

Although the basic idea of the invention is described in an application environment of 3GPP TS 23.216 with the use of entities such as MME, MSC server, MGW, etc., the applications of the invention are not limited thereto. For example, the invention can also be applied to 3GPP TS 23.237, 23.292 and so on. In fact, any entity in the packet switch domain may act as above MME so long as it is able to provide corresponding management/control on VoIP call; and any entity in the circuit switch domain may act as a corresponding control unit in the circuit switch domain so long as it is able to provide corresponding management/control on VoIP call, such as MGW, the MSC Server or the like which manage/handle media. Any entity capable of anchoring the calls made by users may act as SCC AS hereinabove.

Embodiments of the invention have been described hereinabove. It should be noted that the invention is not limited to the specific embodiments hereinabove, but those skilled in the art can make various changes or modifications within the scope of the appended claims.

The invention claimed is:

1. A method for handing over a video conversation from a packet switch domain to a circuit switch domain, comprising:
   transmitting, via a base station in the packet switch domain, a handover request to a control equipment in the packet switch domain according to a measurement report and an identification of a video bearer, after the base station receives the measurement report from a user terminal;
   separating, via the control equipment in the packet switch domain, the video bearer from a non-video bearer according to the identification of the video bearer after the control equipment in the packet switch domain receives the handover request from the base station in the packet switch domain;
   transmitting, via the control equipment in the packet switch domain, the handover request to a control equipment in the circuit switch domain;

transmitting, via the control equipment in the circuit switch domain, a relocation request in which reserving a communication link with a specified rate is indicated to a target radio network controller after the control equipment in the circuit switch domain receives the handover request from the control equipment in the packet switch domain; and negotiating, via the control equipment in the circuit switch domain, with the user terminal to establish a logical communication channel required for the video conversation on the communication link with the specified rate, after the user terminal is handed over to a target network.

2. The method of claim 1, wherein the user terminal initiates the negotiation with the control equipment in the circuit switch domain to establish a logical communication channel required for the video conversation on the communication link with the specified rate, after the user terminal transmits a handover complete message to the target radio network controller.

3. The method of claim 1, further comprising:
initiating the negotiating, via the control equipment in the circuit switch domain, with the user terminal to establish a logical communication channel required for the video conversation on the communication link with the specified rate, after the control equipment in the circuit switch domain receives the handover complete message from the target radio network controller.

4. The method of claim 1, wherein the control equipment in the packet switch domain is a mobility management entity (MME).

5. The method of claim 1, wherein the control equipment in the circuit switch domain is a Mobile Switch Center server or media gateway.

6. An apparatus for handing over a video conversation from a packet switch domain to a circuit switch domain in a base station, comprising:
a receiver configured to receive a measurement report from a user terminal;
a determining processor configured to determine to hand over the video conversation to the circuit switch domain according to the measurement report and an identification of a video bearer; and
a transmitter configured to trans a handover request to a control equipment in the packet switch domain.

7. The apparatus of claim 6, wherein the control equipment in the packet switch domain is a mobility management entity.

8. An apparatus for handing over a video conversation from a packet switch domain to a circuit switch domain in a control equipment in the packet switch domain, comprising:
a receiver configured to receive a handover request from a base station in the packet switch domain;
a separating processor configured to separate a video bearer from a non-video bearer according to an identification of the video bearer; and
a transmitter configured to transmit a handover request in which the handover, being a handover for the video bearer, is indicated to a control equipment in the circuit switch domain.

9. The apparatus of claim 8, wherein the control equipment in the packet switch domain is a mobility management entity.

10. The apparatus of claim 8, wherein the control equipment in the packet switch domain is a mobility management entity.

11. The apparatus of claim 8, wherein control equipment in the circuit switch domain is a Mobile Switch Center server or media gateway.

12. An apparatus for handing over a video conversation from a packet switch domain to a circuit switch domain in a control equipment in the circuit switch domain, comprising:
a receiver configured to receive a handover request from a control equipment in the packet switch domain;
a transmitter configured to transmit a relocation request in which reserving a communication link with a specified rate is indicated to a target radio network controller; and
negotiating processor configured to negotiate with a user terminal to establish a logical communication channel required for the video conversation on the communication link with the specified rate.

13. The apparatus of claim 12, wherein the control equipment in the circuit switch domain is a Mobile Switch Center server or media gateway.

14. The apparatus of claim 12, wherein the negotiating is initiated by the user terminal.

15. The apparatus of claim 12, wherein negotiation is initiated by the control equipment in the circuit switch domain.

16. The apparatus of claim 12, wherein the control equipment in the packet switch domain is a mobility management entity.

* * * * *